No. 847,613. PATENTED MAR. 19, 1907.
J. B. SECOR.
CARRIAGE CONTROLLING MECHANISM FOR TYPE WRITING MACHINES.
APPLICATION FILED MAR. 2, 1904.
4 SHEETS—SHEET 1.
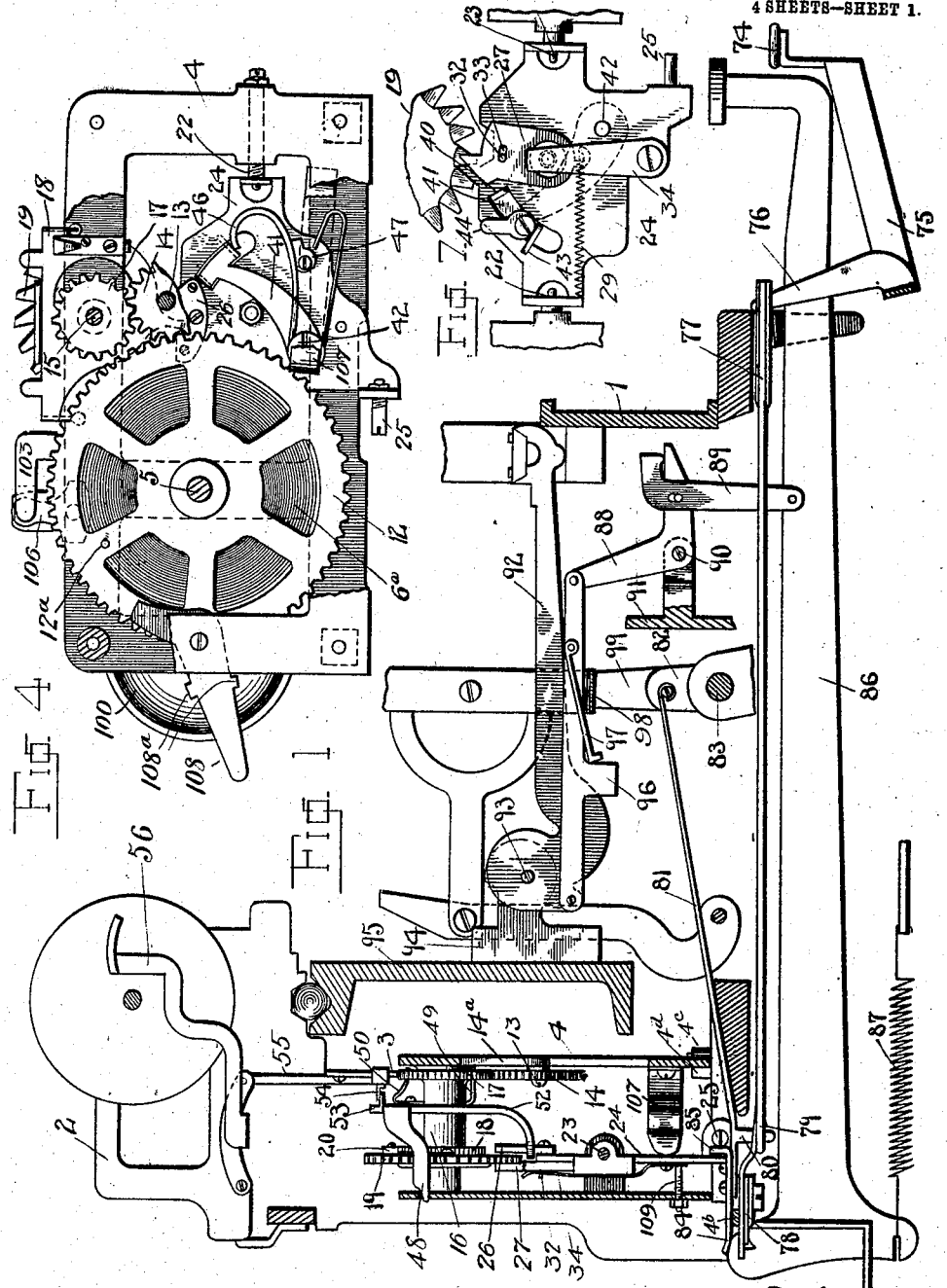

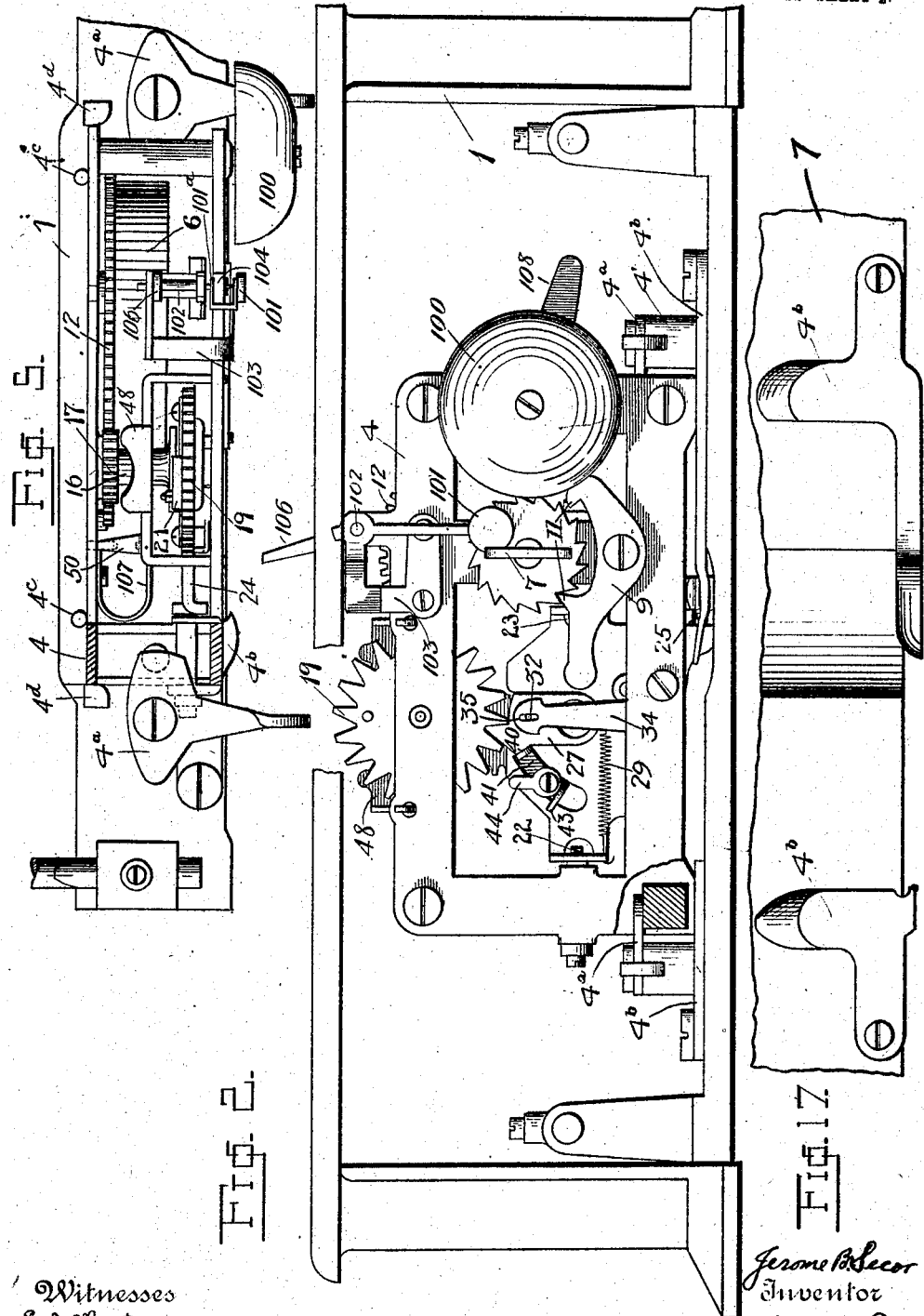

No. 847,613. PATENTED MAR. 19, 1907.
J. B. SECOR.
CARRIAGE CONTROLLING MECHANISM FOR TYPE WRITING MACHINES.
APPLICATION FILED MAR. 2, 1904.
4 SHEETS—SHEET 3.
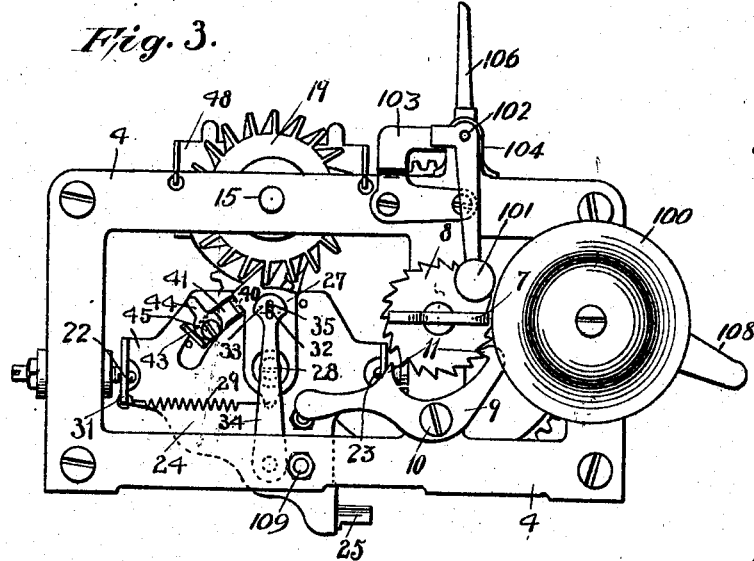
Fig. 11.
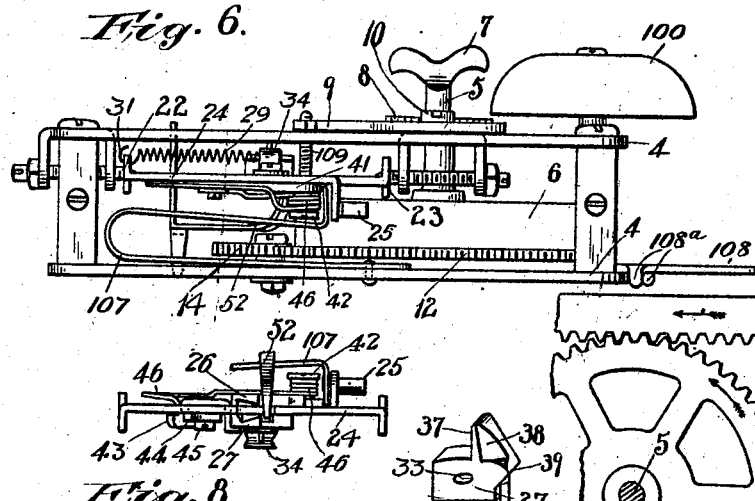
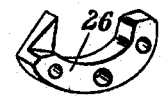
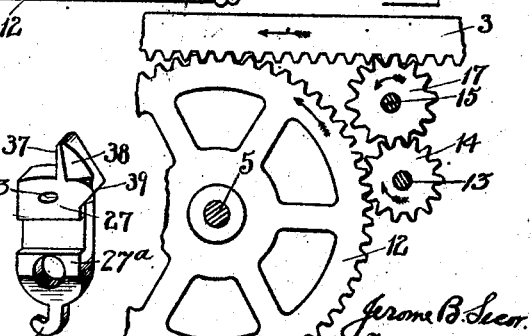
Witnesses
Jerome B. Secor
Inventor
By his Attorneys No. 847,613. PATENTED MAR. 19, 1907.
J. B. SECOR.
CARRIAGE CONTROLLING MECHANISM FOR TYPE WRITING MACHINES.
APPLICATION FILED MAR. 2, 1904.
4 SHEETS—SHEET 4.
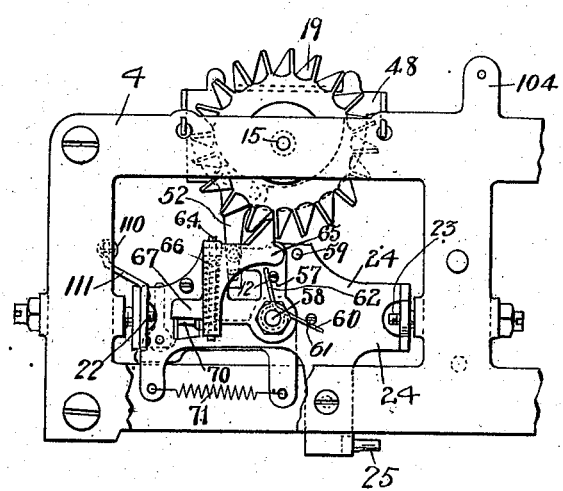
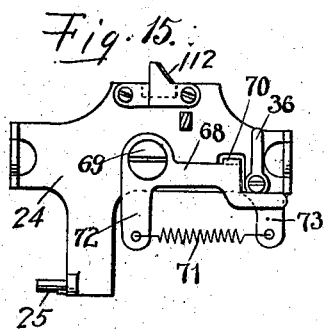
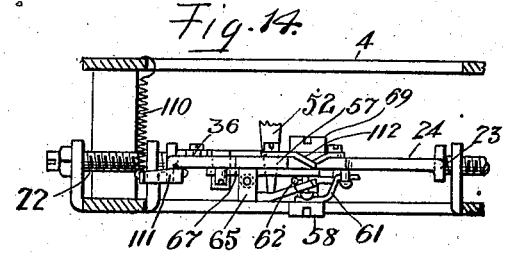
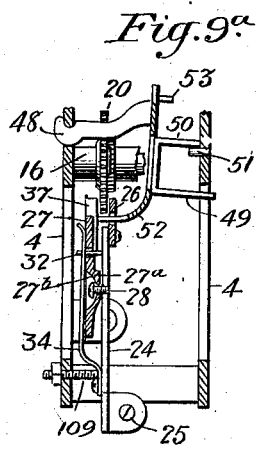
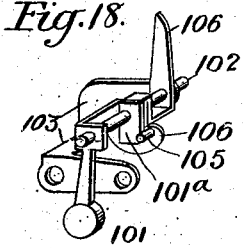
Witnesses
S. J. Hoefter
W. P. Hammond
Jerome B. Secor
Inventor
By his Attorneys
Knight Bros

UNITED STATES PATENT OFFICE.

JEROME B. SECOR, OF DERBY, CONNECTICUT.

CARRIAGE-CONTROLLING MECHANISM FOR TYPE-WRITING MACHINES.

No. 847,613.     Specification of Letters Patent.     Patented March 19, 1907.

Application filed March 2, 1904. Serial No. 196,172.

*To all whom it may concern:*

Be it known that I, JEROME B. SECOR, a citizen of the United States, residing at Derby, in the county of New Haven and State of Connecticut, have invented certain new and useful Improvements in Carriage-Controlling Mechanism for Type-Writing Machines, of which the following is a specification.

My present invention relates to type-writing machines, and more particularly to improvements in escapement and carriage-feed mechanism for type-writing machines and means for mounting the same which will permit the same to be readily removed from the machine for repairing or replacing the parts.

Heretofore in escapement and carriage-feed mechanism for type-writing machines it has been customary to mount the parts upon the frame of the type-writer, making it necessary to disassemble other parts of the machine in removing the parts of such mechanism for the purpose of repairing or replacing said parts.

In the present invention I have provided an independent frame upon which all of the parts of the escapement mechanism and the carriage-feed mechanism are mounted, so that the same may be removed from the machine proper, as a whole, for replacing or repairing of the parts.

My invention furthermore relates to many improved details of structure hereinafter fully described and shown in the accompanying drawings, in which like reference characters refer to like parts, and in which—

Figure 1 is a longitudinal section through a portion of a type-writing machine provided with my improved carriage-controlling mechanism for the purpose of showing the operation of the same, part of the said mechanism being removed for the purpose of clearness. Fig. 2 is a rear view of the said mechanism and its frame, showing a portion of the type-writer frame and the means for detachably mounting the said frame therein. Fig. 3 is a rear elevation of the said frame detached and the mechanism carried thereby. Fig. 4 is a front elevation of the same, with parts of the frame removed to disclose more clearly the mechanism carried thereby. Fig. 5 is a top plan view of the same. Fig. 6 is a bottom plan view of the same. Fig. 7 is a detail rear elevation illustrating the disengaged position of the trip-escapement dog. Fig. 8 is a detail top plan view of the trip-dog, showing a portion of the escapement-throw-out finger. Fig. 9 is a detail perspective view of the trip-dog. Fig. 9ª is a transverse sectional view through the detachable frame, showing the trip-dog forced out of engagement independently of the feed rock-arm. Fig. 10 is a detail perspective view of the spacing-dog. Fig. 11 is a detail perspective view of two of the teeth of the escapement-wheel. Fig. 12 is a rear elevation, with parts broken away, of the spring-drum gear-wheel, the carriage-feed rack-bar in engagement therewith, and the pinions connecting the rack-bar and spring-drum gear-wheel with the escapement mechanism. Fig. 13 is a rear elevation of the detachable frame and the mechanism carried thereby, showing a slightly-modified form of escapement-dogs. Fig. 14 is a plan view of the same, with the escapement-wheel and release-frame removed. Fig. 15 is a front elevation of the feed rock-arm carrying the modified form of escapement-dogs. Fig. 16 is a detail front elevation of the trip-dog bracket, showing the spring controlling the movement of the said dog. Fig. 17 is a detail top plan view of the detachable frame-bolsters pivoted to the machine-frame. Fig. 18 is a detail perspective view of the bell-clapper and clapper-trip device.

Referring now in detail to the drawings, 1 represents the frame of any type-writing machine having the platen-carriage 2 mounted thereon to travel transverse the machine and carrying a feed rack-bar 3. Mounted beneath the rack-bar 3 in the machine-frame is a detachable frame or housing 4. Frame 4 is held in adjusted position by movable plates or clamps 4ª, pivotally mounted on posts 4' on the machine-frame and engaging the upper sides of the end cross-pieces of said frame and by bolsters or lifting devices 4ᵇ, pivotally mounted on the machine-frame and having wedge-shaped faces which engage the under edge of the frame 4 to force the frame 4 upwardly against clamps 4ª. The bolsters 4ᵇ when turned outwardly right and left make room to allow the detachable frame 4 to be easily put in place with the gear 12 and pinion 17 under the teeth of the feed-rack 3. Swinging the bolsters in place raises the frame 4 so that the teeth on gear-wheel 12 and pinion 17 are brought or advanced into engagement with rack 3 more readily than if they were inserted sidewise, Fig. 5.

4$^c$ are a pair of guide pins or projections which prevent the rearward movement of the detachable frame 4 beyond the line of the carriage rack-bar 3.

4$^d$ are guide-posts, one at each end of the frame 4 and which prevent endwise displacement of the frame when in its operative position. The pins or projections 4$^c$ and the posts 4$^d$ form guide-pockets for receiving the corners of the frame 4 to guide the same into the proper position when elevated into its operative position in a manner hereinafter described.

Frame 4 has rotatably mounted therein a shaft 5, upon which is mounted a feed-spring drum or barrel 6, in which is mounted the customary carriage-feed spring 6$^a$, Fig. 4. Shaft 5 has at its rear end a thumb-piece 7, screw-threaded to the said shaft, and also a winding ratchet-wheel 8, rigidly mounted on the said shaft and adapted to turn therewith.

9 is a winding-pawl pivoted at 10 to the detachable frame 4 and having teeth 11 engaging alternately the teeth of the ratchet-wheel 8 to prevent reverse movement of said ratchet-wheel.

The spring-drum 6 is rotatably mounted upon the shaft 5, the spring 6$^a$ in said drum being connected at one end to the said shaft and at its other end to the said drum in customary manner.

12 is a gear-wheel mounted upon the shaft 5 and rigidly secured to the drum 6 to rotate therewith, the teeth of the said gear-wheel 12 meshing with the teeth of the carriage-feed rack-bar 3, as shown in Fig. 1. On gear-wheel 12 is a projection or pin 12$^a$, adapted to engage the end of a safety stop-lever 108, pivoted to the frame 4 and adapted to be moved into and out of the path of said projection or pin 12$^a$. The movement of lever 108 is limited by lugs or ears 108$^a$. Safety stop-lever 108 serves as a lock to the machine when not in use and also to prevent sudden unwinding of the mainspring while the frame 4 is being removed from the machine, and thus saving the parts from injury. Rotatably mounted on a pin 13 in the detachable frame 4 or a bracket 14$^a$ thereon, Fig. 1, is a pinion 14, the teeth of which mesh with the teeth of the gear-wheel 12, Figs. 4 and 6. Rotatably seated above the pinion 14 in the detachable frame 4 is a shaft 15, upon which is rigidly mounted a sleeve 16, having at one end a pinion 17, meshing with the teeth of the pinion 14 and also with the teeth of the carriage-feed rack-bar 3, and at its other end a ratchet-wheel 18. By mounting the spring-drum gear-wheel 12 and the pinion 17 so that their teeth engage the rack-bar a more perfect control and steadier feed of the carriage by the escapement and carriage-feed mechanism, respectively, is insured by increasing the amount of gripping surface in engagement with the rack-bar 3, Fig. 12. The intermediate pinion 14 maintains the relative position of the teeth on the gear-wheel 12 and the pinion 17 on sleeve 15, so that when the mechanism is replaced after removal the teeth on said gear-wheel and pinion will readily enter those of the rack 3.

19 is an escapement-wheel loosely mounted on the shaft 15 against ratchet-wheel 18 and carrying spring-pressed pawls 20 21 in engagement with the ratchet-wheel 18 to allow reverse movement of the sleeve 16 independently of the escapement-wheel 19, Figs. 1 and 5.

Fulcrumed at 22 23 on the frame 4 is a feed rock-arm 24, having at its lower end a lug or projection 25, Fig. 3, for purposes hereinafter described. Rock-arm 24 carries on its front face a space-dog 26, Figs. 1 and 4, and shown in detail in Fig. 10, and on its rear face a trip-dog 27, Figs. 1 and 7, and shown in detail in Fig. 9. Dog 27 is oscillatorially mounted upon a pivot 28, the said dog being held in forward position when disengaged from wheel 19 by a trip-spring 29, secured at one end to a hook 30 on the said dog and at its other end to the bent portion 31 of the arm 24. The forward movement of the trip-dog 27 is limited by a pin 32, mounted in the rock-arm 24, engaging slot or perforation 33 in the said dog 27.

34 is a band-spring secured at its lower end to the rock-arm 24 and connected to the dog 27 at its upper end through means of a slot 35, engaging the pin 32, seated in arm 24 and passing through dog 27, said spring 34 being adapted to retain or hold said dog normally against the feed rock-arm 24.

Dog 27 is so mounted as to be capable of sidewise as well as oscillatory movement. As shown in Figs. 9 and 9$^a$, the said dog 27 is made with a shoulder 27$^a$ on one side and a concavity 27$^b$ on the other side thereof forming a loosely-fitting knife-edge at its pivotal point, permitting a sidewise rocking movement to displace the tooth of the said dog 27 in opposition to the retaining-spring 34 from engagement with the teeth of the ratchet-wheel independent of or without movement of the feed rock-arm 24. Dog 27 is provided with a tooth having a square face 37 and a beveled back 38. Dog 27 is also provided with a shoulder 39, adapted when the said dog is in engagement with one of the teeth of the escapement-wheel 19 to abut a lug 40, projecting through rock-arm 24 on a buffer-arm 41, pivotally mounted on a pin 42, seated in the front face of the rock-arm 24. Buffer-arm 41 is also provided with a lug 43, which projects through rock-arm 24 and is bent to engage the opposite side of the said rock-arm 24, Fig. 3, to hold the said buffer-arm snug thereagainst.

44 is an adjustable stop pivoted at 45 to the arm 24 and engaging the lug 43.

46 is a spring secured at one end to the arm 24, coiled about the pin 42, as shown in Fig. 6, and engaging the lug 43 on buffer-arm 41 to hold the same normally against the stop 44.

47 is a cam pivoted to the front face of the rock-arm 24, the edge of said cam bearing against the spring 46.

Vibration of the arm 24 in the usual step-by-step feed of the carriage, which is accomplished in the manner hereinafter described, throws first the trip-dog 27 and then the space-dog 26 out of engagement with the teeth of the escapement-wheel 19, one of said dogs being in engagement with the said teeth while the other is at rest. When forced out of engagement with one of the teeth of the escapement-wheel 19, the trip-dog 27 is drawn forward by spring 29 until the pin 32 strikes the end of the slot 33. In this position the said dog is in a position to strike the beveled back of the tooth from which it has previously been disengaged to slide into engagement with the square face of the next succeeding tooth of the said escapement-wheel 19. Upon engagement with the next succeeding tooth dog 27 is carried rearwardly by escapement-wheel 19 in opposition to the spring 29 until the shoulder 39 strikes the lug 40 on buffer-arm 41, the movement of which is opposed by the spring 46. The tension of spring 46 may be regulated through adjustment of the cam 47. The position of the buffer-arm 41 may be adjusted by adjustment of the stop 44. It will thus be seen that the resistance of the dog 27 when forced back against the buffer-arm 41 by one of the teeth of the escapement-wheel 19 may be regulated. The object of the buffer-arm 41 is to deaden the impact and prevent injurious jolting of the parts.

Fulcrumed to the detachable frame 4 above the arm 24 is a depressible escapement throw-out frame 48, Figs. 1 and 3, the movement of which in an upward direction is limited by a projection or finger 49 thereon, engaging the frame 4, the downward movement of the said frame 48 being limited by a finger or projection 50, engaging a finger or projection 51 on the frame 4. Frame 48 is provided with a curved downwardly-extending escapement throw-out finger 52, which passes to one side of the dog 26 and over the arm 24, which is recessed in its top side, as shown in dotted lines in Fig. 13, and engages the under side of the dog 27.

Frame 48 is provided at the upper portion thereof with a bearing-flange 53, engaging a bearing-flange 54, hung to a swinging frame 55, carried by the platen-carriage, connected at its upper end to a finger-release lever 56, and sliding on the carriage-feed rack-bar 3. Flanges 53 and 54 and parts connected thereto form a loose connection between the release-key on the carriage and the escapement-dogs. Upon depression of the finger-release lever 56 the frame 55 is depressed, and through the bearing-flange 54 depresses the bearing-flange 53 on the escapement-throw-out frame 48, forcing the finger 52 against the tooth 37 of the dog 27 and forcing said tooth, independently of any movement of rock-arm 24, out of engagement with the teeth of the escapement-wheel 19.

Normally the ratchet-dog 26 is out of engagement with the teeth of the wheel 19, while the trip-dog 27 is normally in engagement with the teeth of said wheel 19. This is because of the normal position of the feed rock-arm 24, caused by the spring 107. The depressible frame 48 and its escapement throw-out finger 52 are provided for the purpose of throwing the dog 27 out of engagement with the teeth of the wheel 19 without disturbing the position of the ratchet-dog 26, so that by depressing the lever 56 on the machine-carriage dog 27 is forced out of engagement with the teeth on wheel 19, so that both dogs 26 and 27 are then out of engagement and the carriage will be allowed to proceed, under control of the hand of the operator, to any desired position determined by the position of one of the ordinary stop devices (not shown) on the machine-frame. By reference to Fig. 9ª it will be seen that dog 27 is capable of sidewise movement in addition to its pivotal movement. In Fig. 9ª both dogs are shown out of engagement with the teeth of the escapement-wheel 19.

Through the connections between the escapement-wheel 19 and the gear-wheel 17, and the gear-wheel 12, carried by the spring-drum 6, the feed of the carriage by the said gear-wheels is governed by the movement of the escapement-wheel 19, the carriage being fed forward only when the said escapement-wheel is disengaged from the escapement-dogs. The pawls 20 21 and ratchet-wheel 18 allow for the return of the carriage to its initial position at the right of the machine through reverse rotation of the sleeve 16 without communicating motion to the escapement-wheel 19. If desired, such pawl-and-ratchet connection between the sleeve 16 and the escapement-wheel 19 may be dispensed with, owing to the beveled backs of the teeth on the escapement-wheel 19, as shown in Fig. 11, and the beveled back of trip-dog 27, Fig. 9. By making the backs of such teeth and the dogs 27 beveled the reversal of the escapement-wheel 19 will displace the dog 27 as each tooth passes the said dog, allowing the carriage to return to its initial position.

In Figs. 13, 14, 15, and 16 I have shown slight modifications in the mounting of the trip-escapement dog. In the structure therein shown I provide a bracket 57, pivoted to a pin 58, passing through the arm 24. When the trip-dog is out of engagement with escapement-wheel 19, bracket 57 is held in a forward position against the stop-pin 59, seated in arm 24, by a spring 60, coiled about the pin 58, one end of the said spring being held by a pin or projection 61 on the arm 24, the other end of the said spring being held by a pin or projection 62 on the bracket 57. Bracket 57 is provided with eye-lugs 63, carrying a pivot-pin 64, upon which is rigidly mounted the trip-dog 65. 66 is a spring coiled about the pin 64 and adapted to hold the dog 65 normally against the bracket 57. Bracket 57 is provided with a rearward extension or arm 67. Upon the opposite side of the arm 24 to that upon which the trip-dog 65 is mounted a buffer-arm 68 is pivotally mounted on pin 69. Buffer-arm 68 is provided with a lug or projection 70, projecting through the arm 24. 71 is a spring connecting an arm 72 on the arm 68 with a lug or projection 73 on the arm 24. 36 is an adjustable stop mounted on arm 24, in engagement with an extension 68$^a$ of arm 68, thus allowing for the adjustment of arm 68 and the tension of spring 71 to regulate the degree of resistance to the impact between the bracket 57 and buffer-arm 68. The function of spring 71 is to hold the lug 70 of the arm 68 in elevated position in the path of the extension 67 of the bracket 57. With the modifications just described in the construction of the movable escapement-dog and its mounting it will be clearly seen that the same functions may be performed by the said dog as those of the dog 27, hereinbefore described. The depression of the finger 52, carried by the release-frame 48, will force the dog 65 outwardly out of engagement with the teeth of the escapement-wheel 19, said dog turning on its pivot-pin 64, the spring 66 returning the dog to its normal position against bracket 57 upon withdrawal of the finger 52. The lug or projection 70 on the buffer-arm 68 deadens the impact and prevents injurious jolting of the parts in the same manner as the buffer-arm 41 receives the impact of the dog 27.

The frame 4 forms a suitable support for the signaling mechanism comprising the bell, the bell-clapper, and the clapper-tripping device. The bell 100 is suitably mounted on one side of the frame 4, Fig. 3. The bell-clapper 101 is hung on a pivot-pin 102, mounted in a bracket 103 and a suitable lug or projection 104 on the frame 4. The clapper 101 has a suitable shank, U-shaped at its upper end to form a double bearing on pin 102 to prevent lateral vibration of the clapper. The shank of the clapper 101 is also bent to form an arm 101$^a$, depending from its bearing, which arm is adapted to be engaged by the pin 105, carried by a weighted arm 106, mounted on the pivot 102. The pin 105 is so positioned on the arm 106 as to engage only one side of the downwardly-projecting arm 101$^a$ on the shank of the clapper 101. Arm 106 projects upwardly into the path of a suitable tripping device (not shown) on the machine-carriage.

In the ordinary travel of the carriage when the same has reached a suitable point determined by the position of the tripping device on the carriage the upwardly-projecting end of the arm 106 is engaged by such tripping device, being forced over and through pin 105, bearing against the depending arm 101$^a$ of the shank of clapper 101, turning the shank of the clapper 101 on its pivot-pin 102, and thereby elevating the clapper. When the tripping device on the carriage has passed over the upwardly-projecting end of the arm 106, the weight on the lower end of the arm 106 returns said arm to its normal position, allowing the clapper to descend quickly and contact with the bell 100. When the carriage is returned to its initial position, the tripping device thereon again passes over the upwardly-projecting end of the arm 106, but this time depresses the same in the opposite direction, carrying the pin 105 away from the depending arm 101$^a$, so that the position of the clapper is not disturbed.

I have now described the detachable frame, the escapement mechanism carried thereby, the bell-trip device, the carriage-feed mechanism *per se*, and the means for throwing out the said mechanism upon depression of the carriage-finger-release lever, and will now proceed to describe the means for actuating such mechanism upon actuation of the spacing-lever or type-bar.

74 is the spacing-bar, positioned at the front of the machine, Fig. 1, and mounted upon a rock-frame 75, connected by an upwardly-projecting finger 76 to a link bar 77, extending longitudinally through the machine and sliding at its rear end upon the key-bar fulcrum-plate 78. Link 77 is provided with a loop 79, engaging a downwardly-projecting finger 80 on the inclined link or rod 81, pivoted at its forward end to a rock-arm 82, mounted on a rock-shaft 83, extending transverse the machine. Link 81 has bolted to its rear end a plate 84, having an upwardly-projecting lug 85, engaging the rear side of the projection 25 on rock-arm 24, as shown in Fig. 1. Plate 84 and projection 25 and parts connected thereto form a loose connection between the key-levers and the escapement-dog. One of the bolsters 4$^b$ is extended, so that in addition to bolstering up the frame 4 against clamps 4$^a$ it will elevate plate 84 and lug 85 to the plane of projection 25 and form a sliding bearing for said plate. The key-bars 86 are fulcrumed on fulcrum-plates 78 at the rear of the machine and are held normally in raised position by springs 87, secured at one end to a portion of the frame of the machine and at their other end to the notch in the said key-bars 86. Positioned above each of the key-bars 86 is a bell-crank 88, connected to the said key-bars 86 by a straddle-link 89. Bell-cranks 88 are pivoted at 90 to brackets 91, mounted in any suitable manner on the frame of the machine.

92 are the type-bars, pivoted at 93 to brackets 94, mounted on the bridge 95 of the machine and connected by straddle-links 96 to bell-cranks 88.

97 is a hook carried by each of the straddle-links 96 and adapted to engage a universal bar 98, carried by the rock-arms 99 (one only shown) on shaft 83.

A depression of any one of the key-bars 86 exerts a downward pull of the straddle-links 89, depressing the forward arm of the bell-crank 88, pulling the straddle-link 96 to throw the type-bar 92 to printing position, and through the hook 97 pulling the universal bar 98 forward, which carries with it the rock-arms 99. Forward movement of the rock-arms 99 will exert a forward pull on the link or bar 81 through its rock-arm 82, pulling the plate 84, bolted thereto at its rear end, forward and vibrating the rock-arm 24. It will be readily seen that vibration of the rock-arm 24 will throw the trip-dog 27 or 65 out of its normal engagement with the teeth of the escapement-wheel 19. The arm 24 is vibrated by the space-bar 74 through means of the upwardly-projecting finger 76 pulling on the link 77, and thereby exerting a forward pull upon the downwardly-projecting finger 80 of the link or bar 81.

107 is a band-spring secured at one end to and mounted on frame 4 and bearing at its free end against the feed rock-arm 24, so that the ordinary rocking movement of said arm 24 to produce the step-by-step feed of the carriage is in opposition to said spring 107, which at each vibration of the arm 24 returns the same to its normal position.

109 is a stop-pin against which rock-arm 24 is held by spring 107 when in its normal position. Pin 109 prevents spring 107 from forcing the lower portion of arm 24 too far toward the rear of the machine, which would throw both the space and the trip dogs out of gear with escapement-wheel 19.

In the modified structure shown in Figs. 13, 14, 15, and 16 instead of the spring 109 a coil-spring 110, secured at one end to frame 4 and at its other end to a projection or arm 111 on rock-arm 24, is used. It will be understood that either form of spring may be used with either structure.

I do not wish to limit myself to the exact means shown and described for actuating the escapement mechanism through actuation of the type-bars or the spacing-bar or the exact means for throwing out the escapement mechanism to allow the carriage to be brought by hand to any desired position, inasmuch as this may be varied without departing from the spirit of my invention. My invention may be, furthermore, varied in details of structure without departing from the spirit of the same, and I do not, therefore, desire to be limited to the exact details of structure shown and described.

Having thus described my invention, the following is what I claim as new therein and desire to secure by Letters Patent:

1. In a type-writing machine, the combination with the machine-frame, a detachable frame, and carriage-controlling mechanism carried thereby, of guide pins or projections mounted on said main frame, bolsters for elevating said detachable frame to its operative position, and clamps for clamping said detachable frame in such position.

2. In a type-writing machine, the combination with the machine-frame, a detachable frame and carriage-controlling mechanism mounted thereon, of projections on the machine-frame forming pockets to receive the corners of said detachable frame, of bolsters for elevating said detachable frame into its operative position, and suitable clamps for clamping the said frame in its operative position.

3. In a type-writing machine, the combination with the machine-frame, a detachable frame and carriage-controlling mechanism mounted thereon, of stop pins or projections on said machine-frame in position to abut said detachable frame and prevent rearward movement of the same, posts or projections on said machine-frame in position to abut and prevent sidewise movement of said detachable frame, means for elevating said detachable frame into its operative position, and means for clamping said detachable frame in such position.

4. In a type-writing machine, the combination with the escapement-wheel and a feed rock-arm mounted in juxtaposition thereto, of a space-dog rigidly mounted on said rock-arm, a trip-dog movably mounted on said rock-arm, spring means connected to and holding said trip-dog normally in a forward position and toward the teeth of the escapement-wheel, and an adjustable spring-resisted buffer-arm in position to engage and oppose the rearward movement of said trip-dog when carried back by engagement with the teeth of the escapement-wheel.

5. In a writing-machine, the combination with the machine-frame, of the detachable frame mounted therein, and means mounted on the machine-frame for elevating and clamping said detachable frame into its adjusted position.

6. In a type-writing machine, the combination with a toothed escapement device geared to the carriage, of a feed rock-arm mounted in juxtaposition thereto, of a space-dog rigidly mounted on said rock-arm, a trip-dog movably mounted on said rock-arm, spring means connected to and holding said trip-dog normally in a forward position and toward the teeth of the escapement-wheel, an adjustable buffer-arm in position to oppose the rearward movement of said trip-dog when carried back by engagement with the teeth of the escapement-wheel, and an adjustable spring resistance opposing said buffer-arm.

7. In a writing-machine, the combination with the machine-frame and the carriage mounted to travel thereon, of the detachable frame, the carriage-feed mechanism mounted thereon, and the means for elevating and clamping said detachable frame into adjusted position.

8. In a writing-machine, the combination with the detachable frame and the carriage-feed mechanism carried thereby, of a pin or projection carried by said mechanism to travel therewith, and a pivoted stop mounted on said frame adapted to be thrown into the path of said pin or projection to stop said mechanism.

9. In a writing-machine, the combination with the machine-frame, of the detachable frame, of the pivotally-mounted clamps in clamping engagement with said detachable frame, and the wedge-faced bolsters in engagement with the under side of said detachable frame, said clamps and bolsters cooperating to prevent vertical and endwise displacement of the detachable frame.

10. In a type-writing machine, the combination with the machine-frame, the carriage mounted to travel thereon, of a gear-wheel geared to said carriage, a feed-spring mounted to rotate said gear-wheel, an escapement-wheel, a pinion mounted to rotate said escapement-wheel and geared to the carriage, and a pinion engaging said gear-wheel and said escapement-wheel pinion.

11. In a type-writing machine, the combination with the machine-frame and the carriage mounted to travel thereon, having a feed rack-bar, of a gear-wheel meshing with said rack-bar, an escapement mechanism, a pinion mounted to rotate with the escapement-wheel and in mesh with said rack-bar, and a pinion meshing with the gear-wheel and with the pinion mounted to move with the escapement-wheel.

12. In a writing-machine, the combination with the machine-frame and a carriage mounted to travel upon said frame, an escapement device controlling the movement of said carriage, a feed rock-arm mounted upon said escapement device, a rigid dog on said arm, a spring-pressed independently-movable dog mounted on said arm, a depressible frame in engagement with said independently-movable dog, means for rocking said arm to throw said dogs alternately into and out of engagement with said escapement device and means carried by the carriage in slidable engagement with said depressible frame to depress said depressible frame and throw said independently-movable dog out of engagement with the escapement device independently of said rock-arm.

13. In a writing-machine, the combination with a detachable frame and the carriage-feed mechanism carried thereby, of a rigid stop device and a movable stop device, one of said devices being carried by said feed mechanism to travel therewith and the other of said stop devices being mounted on said frame, said movable device adapted to be thrown into engagement with the rigid stop device to stop said mechanism.

14. In a type-writing machine, the combination of a housing removable from the machine-frame, a feed spring-barrel mounted in said housing and means for locking said spring-barrel against rotation while out of the machine-frame.

15. In a type-writing machine, the combination of a removable housing carrying feed and escapement mechanism, means for securing said housing in the machine-frame or releasing it therefrom and a lifting device for said housing serving to advance the gearing carried thereby into mesh with the carriage-feed rack when the housing is restored to normal position.

16. In an escapement for type-writing machines, the combination with a member having teeth with beveled rear faces, of a pair of dogs controlling the movement of the toothed member, one of said dogs being provided with a beveled face; means providing both of said dogs with a simultaneous movement transverse to the plane of the said toothed member, and means providing said beveled dog with a movement in the plane of the toothed member and an independent movement transverse to said plane, said independent transverse movement being caused by the engagement of a beveled face on the toothed member with the beveled face on the dog.

17. In an escapement for type-writing machines, the combination with the carriage-spring, of the toothed member moved by the carriage-spring, a pair of dogs controlling the toothed member, means providing both of said dogs with a simultaneous movement transverse to the plane of said member, means providing one of said dogs with movement in the plane of the toothed member and an independent movement transverse to said plane, a spring causing a movement of the latter dog in one direction in the plane of the toothed member, and a separate spring causing the independent movement of the latter dog in one direction transverse of the plane of the toothed member.

18. In an escapement mechanism for type-writing machines, the combination with the escapement-wheel having the rear faces of the teeth beveled, of an arm rocking about an axis transverse of the axis of the escapement-wheel, a pair of dogs carried by said arm, one of said dogs having a beveled rear face, and means permitting said beveled dog to move relatively to the other in the plane of the escapement-wheel to produce the spacing and transversely of said plane when the beveled face on the dog is engaged by the beveled face of the wheel to permit said wheel to rotate in a reverse direction.

19. In an escapement mechanism for typewriting machines, the combination with the escapement member having teeth with beveled rear faces, of an arm rocking about an axis parallel to the direction of movement of the toothed member, a pair of dogs carried by said rocking arm, one of said dogs having a beveled rear face, and means permitting said beveled dog to move relatively to the other in the direction of movement of said toothed member to produce the spacing and in a direction transverse to said toothed member when the beveled face on the dog is engaged by the beveled teeth of the escapement member to permit said member to move in the direction opposed to the spacing movement.

20. In an escapement mechanism, the combination with a carriage-rack and a carriage-return spring, of a gear-wheel mounted on the spring-shaft, turned by the spring and meshing with the rack, a pinion geared to the gear-wheel and meshing with the rack, an escapement-wheel turned by the pinion and means for controlling the escapement-wheel.

21. In an escapement mechanism, a carriage-rack, a spring, a gear connecting the rack and the spring, and an escapement-wheel geared to the rack and to the gear connecting the rack and the spring.

22. In an escapement mechanism, a carriage-rack, a spring, a gear-wheel connecting the rack and the spring-shaft to transmit motion from the spring to the rack, an escapement-wheel, a pinion on the shaft of the escapement-wheel meshing with the rack, and a pinion meshing with the gear-wheel and the other pinion.

23. In a writing-machine, the combination with a machine-frame, and a carriage mounted to travel thereon and a rack mounted on the carriage, of a detachable frame, a feed-spring on said detachable frame, a gear-wheel mounted on the feed-spring meshing with said rack, a device for controlling the movement of said rack, a gear-wheel carried by said controlling device meshing with said rack, and means for maintaining the proper relative positions between the two gear-wheels.

24. The combination with the main frame, of a detachable frame carrying a carriage-return spring, the escapement-dogs and the escapement-wheel; and key-levers on the main frame having loose connection with the escapement-dogs through which the dogs are controlled.

25. In a type-writing machine, the combination of a detachable frame carrying the escapement-dogs, and the escapement-wheel; and a release-key mounted independently of the detachable frame and having a loose connection with the dogs to throw them out of engagement with the escapement-wheel.

26. In a type-writing machine, the combination with a detachable frame carrying the return-spring, the escapement-wheel and the dogs controlling the escapement-wheel; of key-levers mounted independently of the frame, and having a loose connection with the dogs to control them.

27. In a type-writing machine, the combination with a detachable frame carrying the return-spring, the escapement-wheel and the dogs controlling the escapement-wheel; of key-levers mounted independently of the frame and having a loose connection with the dogs to control them, and a release-key having a loose connection with the dogs to release the escapement-wheel.

28. In a type-writing machine, the combination with the carriage and the key-levers, of a detachable frame carrying a return-spring having a loose connection with the carriage, and an escapement mechanism having a loose connection with the carriage and the key-levers.

29. In a type-writing machine, a detachable frame carrying the return-spring, the escapement mechanism and the signaling mechanism, all of said mechanisms having loose connection with the parts which they operate or by which they are operated.

30. In a type-writing machine, the combination with the machine-frame, a carriage mounted to travel thereon, a detachable frame, a carriage-controlling mechanism mounted on said detachable frame and movable plates provided with thumb-pieces mounted on one of said frames and movable into engagement with the other of said frames to hold said detachable frame in adjusted position.

31. In a type-writing machine, the combination with the machine-frame, and a carriage mounted to travel thereon, of a detachable frame, a carriage-controlling mechanism mounted on said detachable frame and with hand-operated movable plates mounted on one of said frames and movable into engagement with the other of said frames to hold said detachable frame in adjusted position.

JEROME B. SECOR.

Witnesses:
  GEO. H. PATTERSON,
  JAMES P. CLARKE.